(12) United States Patent
Douady et al.

(10) Patent No.: US 11,553,137 B2
(45) Date of Patent: Jan. 10, 2023

(54) HIGH DYNAMIC RANGE PROCESSING ON SPHERICAL IMAGES

(71) Applicant: GoPro, Inc., San Mateo, CA (US)

(72) Inventors: Bruno César Douady, Orsay (FR); Guillaume Matthieu Guérin, Chatillon (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/899,770

(22) Filed: Jun. 12, 2020

(65) Prior Publication Data

US 2020/0358944 A1 Nov. 12, 2020

Related U.S. Application Data

(63) Continuation of application No. PCT/US2018/064673, filed on Dec. 10, 2018.

(60) Provisional application No. 62/607,632, filed on Dec. 19, 2017, provisional application No. 62/599,254, filed on Dec. 15, 2017.

(51) Int. Cl.
*H04N 5/235* (2006.01)
*H04N 5/225* (2006.01)

(52) U.S. Cl.
CPC ......... *H04N 5/2355* (2013.01); *H04N 5/2258* (2013.01); *H04N 5/2352* (2013.01)

(58) Field of Classification Search
CPC ... H04N 5/2355; H04N 5/2258; H04N 5/2352
See application file for complete search history.

(56) References Cited

U.S. PATENT DOCUMENTS

| 7,612,804 | B1 | 11/2009 | Marcu |
| 9,639,935 | B1 | 5/2017 | Douady-Pleven |
| 9,697,592 | B1 * | 7/2017 | Dai .................. G06T 3/0093 |

(Continued)

FOREIGN PATENT DOCUMENTS

| EP | 2458882 A1 | 5/2012 |
| EP | 3139345 A1 * | 3/2017 ........... H04N 1/4072 |

(Continued)

OTHER PUBLICATIONS

C. Pernechele, "Hyper hemispheric lens," Opt. Express 24, 5014-5019 (2016). (Year: 2016).*

(Continued)

*Primary Examiner* — Michael Robert Cammarata
(74) *Attorney, Agent, or Firm* — Young Basile Hanlon & MacFarlane, P.C.

(57) ABSTRACT

Image signal processing includes obtaining two or more image signals from a first hyper-hemispherical image sensor, where each of the two or more image signals has a different exposure and obtaining two or more image signals from a second hyper-hemispherical image sensor, where each of the two or more image signals has a different exposure. Image signal processing includes generating an exposure compensated image based on a gain value applied to an exposure level of a first image and a gain value applied to an exposure level of a second image. Image signal processing further includes performing high dynamic range (HDR) processing on the exposure compensated image. The HDR processing may be performed on a high a frequency portion of the exposure compensated image.

20 Claims, 8 Drawing Sheets

(56) References Cited

U.S. PATENT DOCUMENTS

| | | | | |
|---|---|---|---|---|
| 10,009,551 | B1* | 6/2018 | Adcock | H04N 5/265 |
| 2007/0009176 | A1* | 1/2007 | Lim | G06T 5/004 |
| | | | | 382/275 |
| 2007/0216776 | A1* | 9/2007 | Woolfe | H04N 1/6086 |
| | | | | 345/589 |
| 2007/0253704 | A1* | 11/2007 | Clemens | G03B 41/00 |
| | | | | 396/439 |
| 2009/0175492 | A1* | 7/2009 | Chen | G06K 9/32 |
| | | | | 382/100 |
| 2010/0195901 | A1* | 8/2010 | Andrus | H04N 9/045 |
| | | | | 382/162 |
| 2011/0080487 | A1* | 4/2011 | Venkataraman | H04N 5/23296 |
| | | | | 348/218.1 |
| 2012/0002082 | A1* | 1/2012 | Johnson | H04N 5/23258 |
| | | | | 348/234 |
| 2012/0189206 | A1* | 7/2012 | Iketani | H04N 1/4092 |
| | | | | 382/190 |
| 2012/0236020 | A1* | 9/2012 | Paris | G06T 5/10 |
| | | | | 345/589 |
| 2012/0308156 | A1* | 12/2012 | Yamazaki | H04N 5/243 |
| | | | | 382/284 |
| 2013/0121572 | A1* | 5/2013 | Paris | G06T 5/007 |
| | | | | 382/166 |
| 2013/0229546 | A1* | 9/2013 | Furumura | G06T 5/50 |
| | | | | 348/229.1 |
| 2014/0112595 | A1* | 4/2014 | Huang | H04N 19/98 |
| | | | | 382/264 |
| 2015/0237322 | A1* | 8/2015 | Stec | H04N 5/20 |
| | | | | 348/453 |
| 2016/0027160 | A1* | 1/2016 | Aydin | G06T 5/007 |
| | | | | 382/162 |
| 2016/0027161 | A1* | 1/2016 | Aydin | H04N 19/137 |
| | | | | 382/162 |
| 2016/0269607 | A1* | 9/2016 | Nomura | H04N 5/23238 |
| 2017/0104971 | A1* | 4/2017 | Jiang | H04N 9/68 |
| 2017/0208234 | A1* | 7/2017 | Wang | G06T 7/49 |
| 2017/0264839 | A1* | 9/2017 | Uvarov | H04N 5/2355 |
| 2017/0289571 | A1* | 10/2017 | El Mezeni | H04N 19/182 |
| 2018/0047141 | A1* | 2/2018 | El Mezeni | G06T 5/007 |
| 2018/0160042 | A1* | 6/2018 | He | H04N 5/23293 |
| 2018/0241929 | A1* | 8/2018 | Bouzaraa | H04N 5/23277 |
| 2018/0270493 | A1* | 9/2018 | Chalmers | H04N 19/46 |
| 2018/0302544 | A1* | 10/2018 | Dhiman | G06T 7/246 |
| 2018/0373017 | A1* | 12/2018 | Dixon | G01N 21/6458 |
| 2019/0164261 | A1* | 5/2019 | Sunkavalli | G06T 1/0007 |
| 2019/0208106 | A1* | 7/2019 | Lukac | G06T 5/20 |
| 2020/0005508 | A1* | 1/2020 | Hu | G06K 9/4652 |
| 2020/0020075 | A1* | 1/2020 | Khwaja | G06T 5/007 |
| 2020/0204763 | A1* | 6/2020 | Zhu | H04N 5/2352 |
| 2020/0280669 | A1* | 9/2020 | Kawaguchi | H04N 5/23238 |
| 2021/0166360 | A1* | 6/2021 | Kim | G06N 3/08 |

FOREIGN PATENT DOCUMENTS

| | | | | |
|---|---|---|---|---|
| WO | 2014025588 | A1 | 2/2014 | |
| WO | WO-2014066352 | A1 * | 5/2014 | G06F 3/012 |
| WO | 2016148962 | A1 | 9/2016 | |
| WO | 2017205492 | A1 | 11/2017 | |

OTHER PUBLICATIONS

T. Ho and M. Budagavi, "Dual-fisheye lens stitching for 360-degree imaging," 2017 IEEE International Conference on Acoustics, Speech and Signal Processing (ICASSP), New Orleans, LA, 2017, pp. 2172-2176, doi: 10.1109/ICASSP.2017.7952541. (Year: 2017).*

Soler Cubero, Oscar. "Image Stitching." (2011). (Year: 2011).*

C. Doutre and P. Nasiopoulos, "Fast vignetting correction and color matching for panoramic image stitching", Proc. IEEE Int. Conf. Image Process., pp. 709-712, 2009. (Year: 2009).*

Brown, M., & Lowe, D. G. (2007). Automatic panoramic image stitching using invariant features. International journal of computer vision, 74(1), 59-73. (Year: 2007).*

A. Levin, A. Zomet, S. Peleg, and Y. Weiss, "Seamless image stitching in the gradient domain," in Proc. European Conf. Computer Vision (ECCV 2004), pp. 377-389. (Year: 2004).*

M. Uyttendaele, A. Eden and R. Skeliski, "Eliminating ghosting and exposure artifacts in image mosaics," Proceedings of the 2001 IEEE Computer Society Conference on Computer Vision and Pattern Recognition. CVPR 2001, 2001, pp. II-II, doi: 10.1109/CVPR.2001. 991005. (Year: 2001).*

R. O'Malley, E. Jones and M. Glavin, "Rear-Lamp Vehicle Detection and Tracking in Low-Exposure Color Video for Night Conditions," in IEEE Transactions on Intelligent Transportation Systems, vol. 11, No. 2, pp. 453-462, Jun. 2010, doi: 10.1109/TITS.2010. 2045375. (Year: 2010).*

B. Pillman, "Camera exposure determination based on a psychometric quality model," 2010 IEEE Workshop On Signal Processing Systems, 2010, pp. 339-344, doi: 10.1109/SIPS.2010.5624814. (Year: 2010).*

Lu Y, Wang K, Fan G. Photometric Calibration and Image Stitching for a Large Field of View Multi-Camera System. Sensors (Basel). 2016;16(4):516. Published Apr. 11, 2016. doi:10.3390/s16040516 (Year: 2016).*

Brown, M., Lowe, D.G. Automatic Panoramic Image Stitching using Invariant Features. Int J Comput Vision 74, 59-73 (2007). https://doi.org/10.1007/s11263-006-0002-3 (Year: 2007).*

T. Fujiki, N. Adami, T. Jinno and M. Okuda, "High dynamic range image compression using base map coding," Proceedings of The 2012 Asia Pacific Signal and Information Processing Association Annual Summit and Conference, 2012, pp. 1-4.3 (Year: 2012).*

X. Li, K. M. Lam, and L. Shen, "An adaptive algorithm for the display of high-dynamic range images," Journal of Visual Communication and Image Representation, vol. 18, No. 5, pp. 397-405, Oct. 2007. (Year: 2007).*

T. Jinno, M. Okuda and N. Adami, "New local tone mapping and two-layer coding for HDR images," 2012 IEEE International Conference on Acoustics, Speech and Signal Processing (ICASSP), 2012, pp. 765-768, doi: 10.1109/ICASSP.2012.6287996. (Year: 2012).*

Smith, K., Krawczyk, G., Myszkowski, K. and Seidel, H.-P. (2006), Beyond Tone Mapping: Enhanced Depiction of Tone Mapped HDR Images. Computer Graphics Forum, 25: 427-438. https://doi.org/10.1111/j.1467-8659.2006.00962.x (Year: 2006).*

International Search Report for Appl. No. PCT/US2018/064673, dated Mar. 21, 2019, 7 pages.

Corrercted International Search Report for Application No. PCT/US2018/064673, dated Apr. 29, 2019, 7 pages.

International Preliminary Report on Patentability for App No. PCT/US2018/064673, dated Jun. 25, 2020, 6 pages.

* cited by examiner

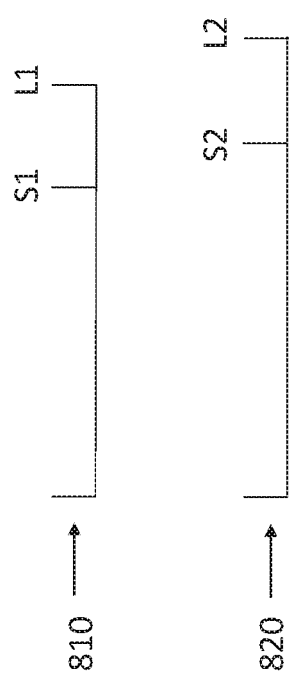

HIGH DYNAMIC RANGE PROCESSING ON SPHERICAL IMAGES

CROSS-REFERENCE TO RELATED APPLICATION(S)

This application is a continuation of International Application No. PCT/US2018/064673, filed Dec. 10, 2018, which claims priority to and the benefit of U.S. Provisional Patent Application No. 62/599,254, filed Dec. 15, 2017, and U.S. Provisional Patent Application No. 62/607,632, filed Dec. 19, 2017, the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing, including temporal and spatial image noise reduction, local motion compensation, local exposure compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for high dynamic range (HDR) image signal processing on spherical images. An apparatus may include a first hyper-hemispherical image sensor, a second hyper-hemispherical image sensor, and an image signal processor. The image signal processor may obtain two or more image signals from the first hyper-hemispherical image sensor, where each of the two or more image signals has a different exposure. For example, the image signal processor may obtain a short exposure image signal associated with a first image and a long exposure image signal associated with the first image.

The image signal processor may obtain two or more image signals from the second hyper-hemispherical image sensor, where each of the two or more image signals has a different exposure. For example, the image signal processor may obtain a short exposure image signal associated with a second image and a long exposure image signal associated with the second image.

The image signal processor may join an edge of the first image to an edge of the second image to form a stitch point between the edge of the first image and the edge of the second image. The image signal processor may determine an exposure level for each of the first image and the second image. The exposure level of the first image may be lower than the exposure level of the second image.

The image signal processor may then generate an exposure compensated image based on a gain value applied to the first image and a gain value applied to the second image. The gain values are applied on each image to compensate for the difference of exposure level and ISO gain applied in the sensor where a gain value of greater than 1 is applied to the shorter exposure image. For example, if the first image is exposed 1 ms and the second image is exposed 2 ms, both with the same ISO gain, before stitching the 2 images into a global spherical image, a gain of 2 is applied to the first image so that both images now have pixel values corresponding to the number of photons received during 2 ms. The exposure compensated image may have a higher dynamic range than the first image, the second image, or both. The image signal processor may then perform HDR processing on the exposure compensated image to generate an HDR image. The HDR processing may be performed on a high a frequency portion of the exposure compensated image. The high frequency portion of the exposure compensated image may be a field of view that is less than or equal to 90 degrees.

The HDR processing may include generating a base layer from the exposure compensated image. The base layer may be generated by averaging two or more pixel values over a disc larger than 90 degrees. For example, the base layer may be generated by averaging all the pixels in a large disc, such as a disc of about 90° of diameter. The values that are averaged may be associated with an exposure level, a saturation level, or both. The image signal processor may suppress all or a portion of the base layer by dividing the exposure compensated image by the base layer. Alternatively, the image signal processor may suppress all or a portion of the base layer by subtracting the base layer from the exposure compensated image.

An aspect may include a method for obtaining an HDR image. The method may include obtaining a short exposure image signal associated with a first image, a long exposure image signal associated with the first image, or both. The method may include obtaining a short exposure image signal associated with a second image, a long exposure image signal associated with the second image, or both.

An aspect may include an apparatus that includes an image signal processor. The image signal processor may be configured to determine an exposure level for each of a first image, a second image, or both. The exposure level of the first image may be lower than the exposure level of the second image. The image signal processor may be configured to obtain an exposure compensated image. The exposure compensated image may be based on a gain value applied to the exposure level of the first image, a gain value applied to the exposure level of the second image, or both. The exposure compensated image may have a higher dynamic range than the first image, the second image, or both. The image signal processor may be configured to obtain an HDR image. The image signal processor may obtain the HDR image by performing HDR processing on a high a frequency portion of the exposure compensated image.

An implementation may include an apparatus that includes an image sensor and an image signal processor. The apparatus may include a second image sensor. The image sensor, the second image sensor, or both, may be hyper-hemispherical image sensors. The image signal processor may be configured to obtain a first image from the image sensor. The first image may include a short exposure image signal, a long exposure image signal, or both.

The image signal processor may be configured to obtain a second image from the second image sensor. The second image may include a short exposure image signal, a long exposure image signal, or both. In an example, the image signal processor may be configured to join an edge of the first image to an edge of the second image to form a stitch point between the edge of the first image and the edge of the second image.

The image signal processor may be configured to determine an exposure level for each of the first image, the second image, or both. In an example, the exposure level of the first image may be lower than the exposure level of the second image. The image signal processor may be configured to obtain an exposure compensated image. The exposure compensated image may be based on a gain value applied to the exposure level of the first image, a gain value applied to the exposure level of the second image, or both. In an example, the exposure compensated image may have a higher dynamic range than the first image, the second image, or both.

The image signal processor may be configured to perform HDR processing on the exposure compensated image to obtain an HDR image. In an example, the HDR processing may be performed on a high a frequency portion of the exposure compensated image. The high frequency portion of the exposure compensated image may include a field of view that is less than or equal to 90 degrees. The HDR processing may include obtaining a base layer from the exposure compensated image. The base layer may be obtained by averaging two or more values over a disc larger than 90 degrees. In an example, the base layer may be obtained by applying an edge-aware non-linear filter. The edge-aware non-linear filter may be a bilateral filter.

The image signal processor may be further configured to compress the base layer. For example, the image signal processor may be configured to compress the base layer by suppressing a portion of the base layer. For example, the image signal processor may suppress a portion of the base layer by dividing the exposure compensated image by the base layer. In another example, the image signal processor may suppress a portion of the base layer by subtracting the base layer from the exposure compensated image. The image signal processor may suppress a first portion of the base layer by dividing the exposure compensated image by the base layer and suppress a second portion of the base layer by subtracting the base layer from the exposure compensated image.

The image signal processor may be configured to apply a local tone mapping operator to the HDR image. For example, the local tone mapping operator may be applied by compressing the base layer and preserving high frequency details.

An implementation may include a method for obtaining an HDR image. The method may include obtaining a short exposure image signal associated with a first image, a long exposure image signal associated with the first image, or both. The method may include obtaining a short exposure image signal associated with a second image, a long exposure image signal associated with the second image, or both.

The method may include determining an exposure level for the first image, the second image, or both. In an example, the exposure level of the first image may be lower than the exposure level of the second image.

The method may include obtaining an exposure compensated image based on a gain value applied to the exposure level of the first image, a gain value applied to the exposure level of the second image, or both. In an example, the exposure compensated image may have a higher dynamic range than the first image, the second image, or both.

The method may include obtaining an HDR image by performing HDR processing on the exposure compensated image. The HDR processing may be performed on a high a frequency portion of the exposure compensated image. The HDR processing may include obtaining a base layer from the exposure compensated image. For example, the base layer may be obtained by averaging two or more values over a disc larger than 90 degrees. In another example, the base layer may be obtained by applying an edge-aware non-linear filter. The edge-aware non-linear filter may be a bilateral filter.

The method may include compressing the base layer. For example, the base layer may be compressed by suppressing a portion of the base layer. The portion of the base layer may be suppressed by dividing the exposure compensated image by the base layer, subtracting the base layer from the exposure compensated image, or both.

An apparatus may include an image signal processor. The image signal processor may be configured to determine an exposure level for a first image, a second image, or both. The exposure level of the first image may be lower than the exposure level of the second image. The image signal processor may be configured to obtain an exposure compensated image. The exposure compensated image may be based on a gain value applied to the exposure level of the first image, a gain value applied to the exposure level of the second image, or both. The exposure compensated image may have a higher dynamic range than the first image, the second image, or both. The image signal processor may be configured to obtain an HDR image. The image signal processor may obtain the HDR image by performing HDR processing on a high a frequency portion of the exposure compensated image.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 8 is a diagram of an example of compensating for an exposure and gain difference between two hyper-hemispherical sensors.

Figure 1:
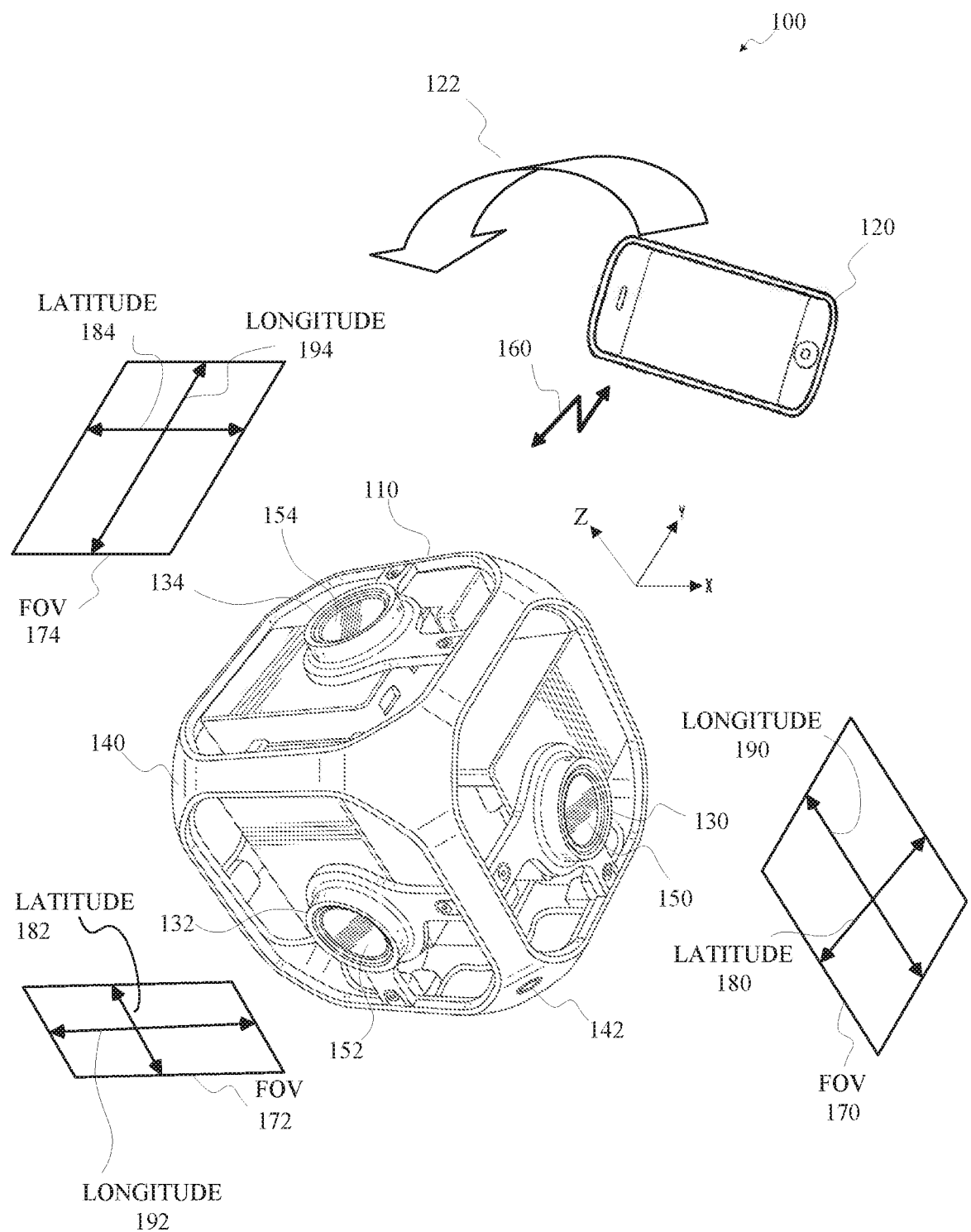
FIG. 1 is a diagram of an example of an image capture system for content capture in accordance with implementations of this disclosure.

All figures disclosed herein are © Copyright 2020 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the similar reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more image sensors and may process the image signal to generate one or more processed images, pictures, or frames. Processing the images by the image signal processor may include identifying exposure information, such as exposure levels, representing exposure values between the respective images and/or reference data. For example, the image signal processor may perform exposure estimation to generate the exposure information. The image signal processor may output the processed images, which may include storing the processed images, such as in a memory of the image capture device. An encoder, such as an encoder included in the image capture device, may access the processed images output by the image signal processor and may generate corresponding encoded images by encoding the processed images. Encoding the processed images by the encoder may include performing exposure estimation to identifying exposure information, such as exposure levels, representing exposure values between the respective images and/or reference data.

When capturing spherical images, complications arise due to situations where one part of the scene is substantially brighter than another part of the scene. For example, in an indoor scene with a window showing outdoor content, an image captured on the side of the room with the window may have an exposure level that is lower than an exposure level for an image captured on the side of the room without the window. While a smartphone would have difficulties in the rare case where both the indoor and the outdoor parts of the scene are captured by its field of view, a spherical camera would have to handle this high dynamic situation nearly all the time. When stitching images together from different hyper-hemispherical sensors with different exposures, a stitch line becomes visible where the images overlap or meet. It would be desirable to avoid losing information when building an image from two hyper-hemispherical sensors with different exposures while making the stitch line imperceivable to the human eye.

Low spatial frequencies may be approximately 90 degrees or larger wavelength. The human eye is almost blind to low spatial frequencies, for example, the human eye may not detect differences in pixels that are spaced greater than 90 degrees apart. Although the human eye is almost blind to low spatial frequencies, a large part of the actual dynamic of the signal is carried by this low spatial frequency portion, as in the example above where most of the dynamic is carried by the difference between the indoor and the outdoor portions of the image.

FIG. 1 is a diagram of an example of an image capture system 100 for content capture in accordance with implementations of this disclosure. As shown in FIG. 1, an image capture system 100 includes an image capture apparatus 110, an external user interface (UI) device 120, or a combination thereof.

In some implementations, the image capture apparatus 110 may be a multi-face apparatus and may include multiple image capture devices. Such as image capture devices 130, 132, 134 are shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of the sides of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, respective image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, respective image capture devices 130, 132, 134 may have a respective field-of-view 170, 172, 174, such as a field-of-view 170, 172, 174 that 90° in a lateral, or latitudinal, dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the lateral dimension 184 of the field-of-view 174 for the image capture device 134, the lateral dimension 180 of the field-of-view 170 for the image capture device 130 may be oriented at 90° with respect to the longitudinal dimension 192 of the field-of-view 172 for the image capture device 132, and the lateral dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by respective image capture device 130, 132, 134 may be combined to form a panoramic image.

As shown in FIG. 1, an image capture device 130, 132, 134 includes a lens 150, 152, 154 or another optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, in some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

For example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application, may generate and share, such as via a cloud-based or social media service, one or more images, or short video clips, such as in response to user input.

In some implementations, the user interface device 120, such as via an application, may remotely control the image capture apparatus 110, such as in response to user input.

In some implementations, the user interface device 120, such as via an application, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application, may mark or tag one or more key moments contemporaneously with capturing the images or video by the image capture apparatus 110, such as in response to user input.

In some implementations, the user interface device 120, such as via an application, may display, or otherwise present, marks or tags associated with images or video, such as in response to user input. For example, marks may be presented in a camera roll application for location review and/or playback of video highlights.

In some implementations, the user interface device 120, such as via an application, may wirelessly control camera software, hardware, or both. For example, the user interface device 120 may include a graphical interface accessible by a user for selecting a live or previously recorded video stream from the image capture apparatus 110 for display on the user interface device 120. The graphical interface may be web-based.

In some implementations, the user interface device 120 may receive information indicating a user setting, such as an image resolution setting, such as 3840 pixels by 2160 pixels, a frame rate setting, such as sixty frames per second (fps), a location setting, and/or a context setting, which may indicate an activity, such as mountain biking, in response to user input, and may communicate the settings, or related information, to the image capture apparatus 110.

Figure 2:
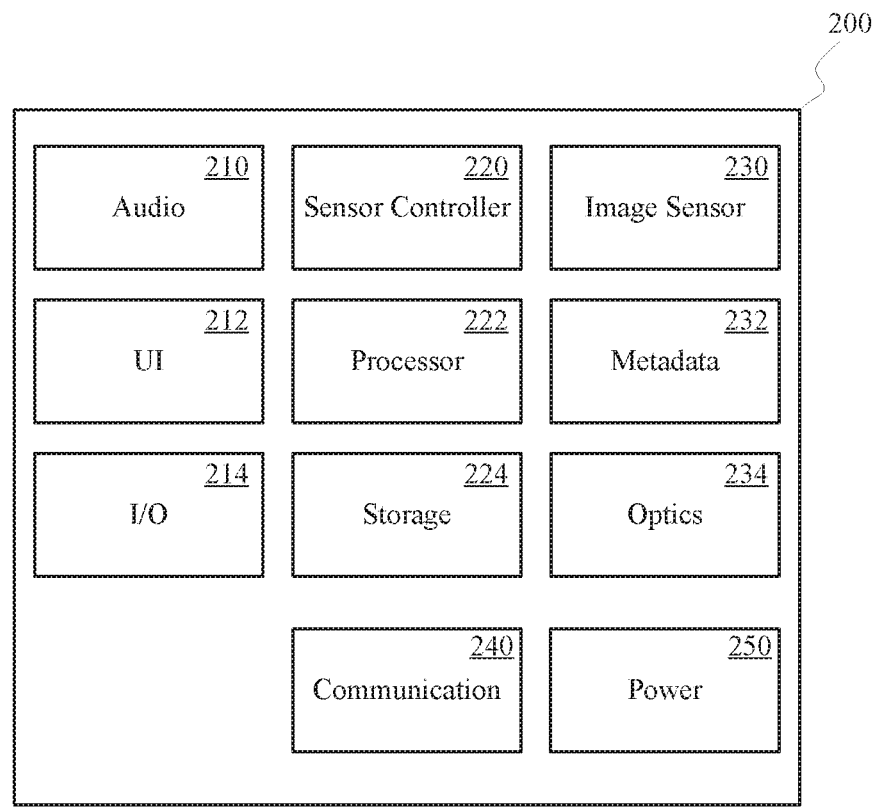
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, for example, Advanced Audio Coding (AAC), Audio Compression—3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, an NFC interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers.

In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content, such as metadata, images, audio, or a combination thereof, captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular Long Term Evolution (LTE), communications interface for communication between the image capture device 200 and a remote device, such as the user interface device 120 in FIG. 1. The communication unit 240 may communicate using, for example, Ethernet, 802.11, world-wide interoperability for microwave access (WiMAX), 3G, LTE, digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200, such as shown and described with respect to FIG. 1. Multiple mechanical, sensory, or electrical units may be controlled by a learning apparatus via network/radio connectivity.

Figure 3:
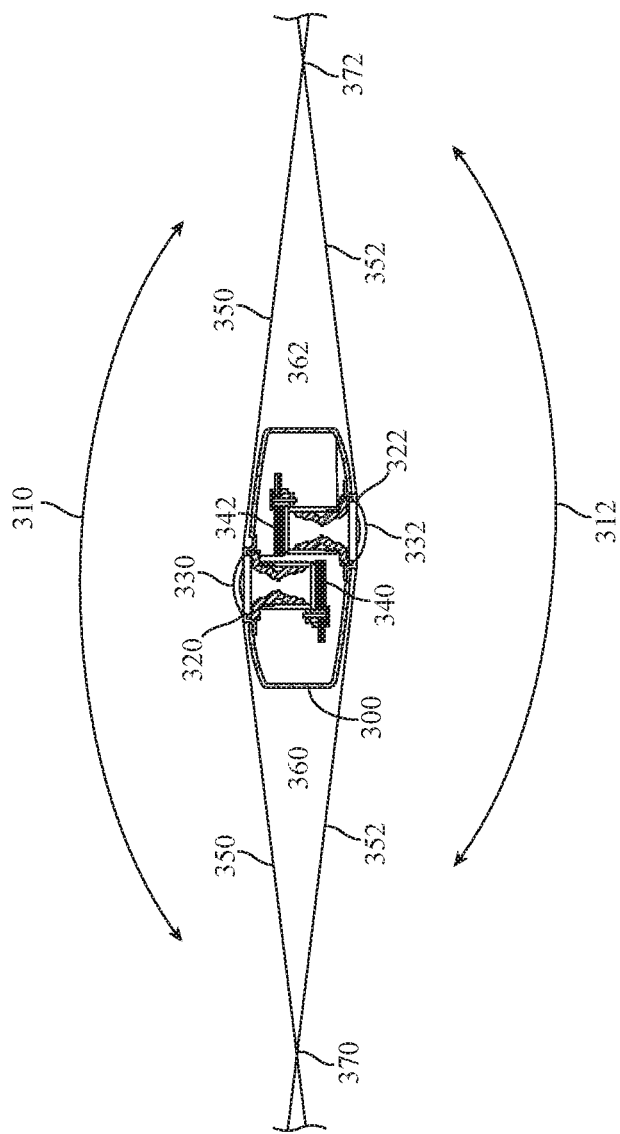
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 includes image capture devices 320, 322, related components, or a combination thereof, arranged in a back-to-back or Janus configuration. For example, a first image capture device 320 includes a first lens 330 and a first image sensor 340, and a second image capture device 322 includes a second lens 332 and a second image sensor 342 arranged oppositely from the first lens 330 and the first image sensor 340. Some examples of image capture devices 320 and 322 may include multiple lenses, multiple sensors, or both.

The first lens 330 of the image capture apparatus 300 has a field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 has a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
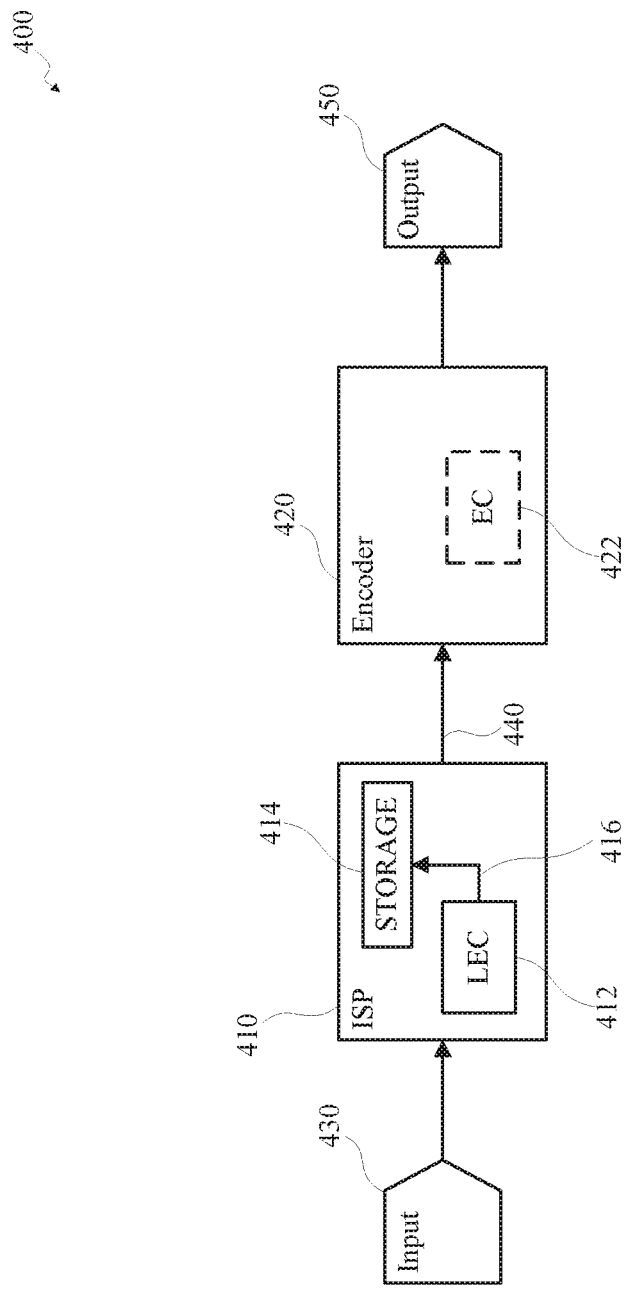
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

In some implementations, the image signal processor 410 may include a local exposure compensation unit 412, which may generate local exposure compensation information for use in image signal processing and encoding, such as in correcting distortion, stitching, and/or exposure compensation. In some implementations, the local exposure compensation unit 412 may partition the input image signal 430 into blocks, such as having 2×2, 4×4, 16×16, 64×64, and/or other dimensions. In some implementations, the local exposure compensation unit 412 may partition the input image signal 430 into arbitrarily shaped patches and/or individual pixels.

In some implementations, the local exposure compensation unit 412 may compare pixel values of blocks of pixels between image frames, such as successive image frames, from the input image signal 430 to determine displacement, or movement, between frames. The local exposure compensation unit 412 may produce exposure values at multiple locations within an image frame.

In some implementations, the image signal processor 410 of the image processing and coding pipeline 400 includes an internal electronic storage unit 414, such as shared memory, such as random-access memory (RAM), flash, or other types of memory. The internal electronic storage unit 414 may store local exposure compensation information 416 determined by the local exposure compensation unit 412 for one or more frames. The local exposure compensation information 416 and associated image or images may be output 440 to the encoder 420. In some implementations, the internal electronic storage unit 414 may include a buffer, or cache, and may buffer the input image signal as an input, or source, image, or frame.

In some implementations, the image signal processor 410 may output an image, associated local exposure compensation information 416, or both as the output 440. For example, the image signal processor 410 may receive the input image signal 430, process the input image signal 430, and output a processed image as the output 440. Processing the input image signal 430 may include generating and using the local exposure compensation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include exposure compensation.

In some implementations, the encoder 420 may output encoded video as an encoded output 450. For example, the encoder 420 may receive the output 440 of the image signal processor 410, which may include processed images, the local exposure compensation information 416, or both. The encoder 420 may encode the images and may output the encoded images as the encoded output 450.

In some implementations, the encoder 420 may include an exposure compensation unit 422 that may determine motion information for encoding the image output 440 of the image signal processor 410. In some implementations, the encoder 420 may encode the image output 440 of the image signal processor 410 using exposure information generated by the exposure compensation unit 422 of the encoder 420, the local exposure compensation information 416 generated by the local exposure compensation unit 412 of the image signal processor 410, or a combination thereof.

For example, the exposure compensation unit 422 may determine exposure information at pixel block sizes that may differ from pixel block sizes used by the local exposure compensation unit 412. In another example, the exposure compensation unit 422 of the encoder 420 may generate motion information and the encoder may encode the image output 440 of the image signal processor 410 using the exposure information generated by the exposure compensation unit 422 of the encoder 420 and the local exposure compensation information 416 generated by the local exposure compensation unit 412 of the image signal processor 410. In another example, the exposure compensation unit 422 of the encoder 420 may use the local exposure compensation information 416 generated by the local exposure compensation unit 412 of the image signal processor 410 as input for efficiently and accurately generating exposure compensation information.

In some implementations, the image signal processor 410, the encoder 420, or both are distinct units, as shown. For example, the image signal processor 410 may include an exposure compensation unit, such as the local exposure compensation unit 412 as shown, and/or the encoder 420 may include an exposure compensation unit, such as the exposure compensation unit 422.

In some implementations, the image signal processor 410 may store exposure compensation information, such as the local exposure compensation information 416, in a memory, such as the internal electronic storage unit 414, and the encoder 420 may read the exposure compensation information from the internal electronic storage unit 414 or otherwise receive the exposure compensation information from the image signal processor 410. The encoder 420 may use the exposure compensation information determined by the image signal processor 410 for exposure compensation processing.

Figure 5:
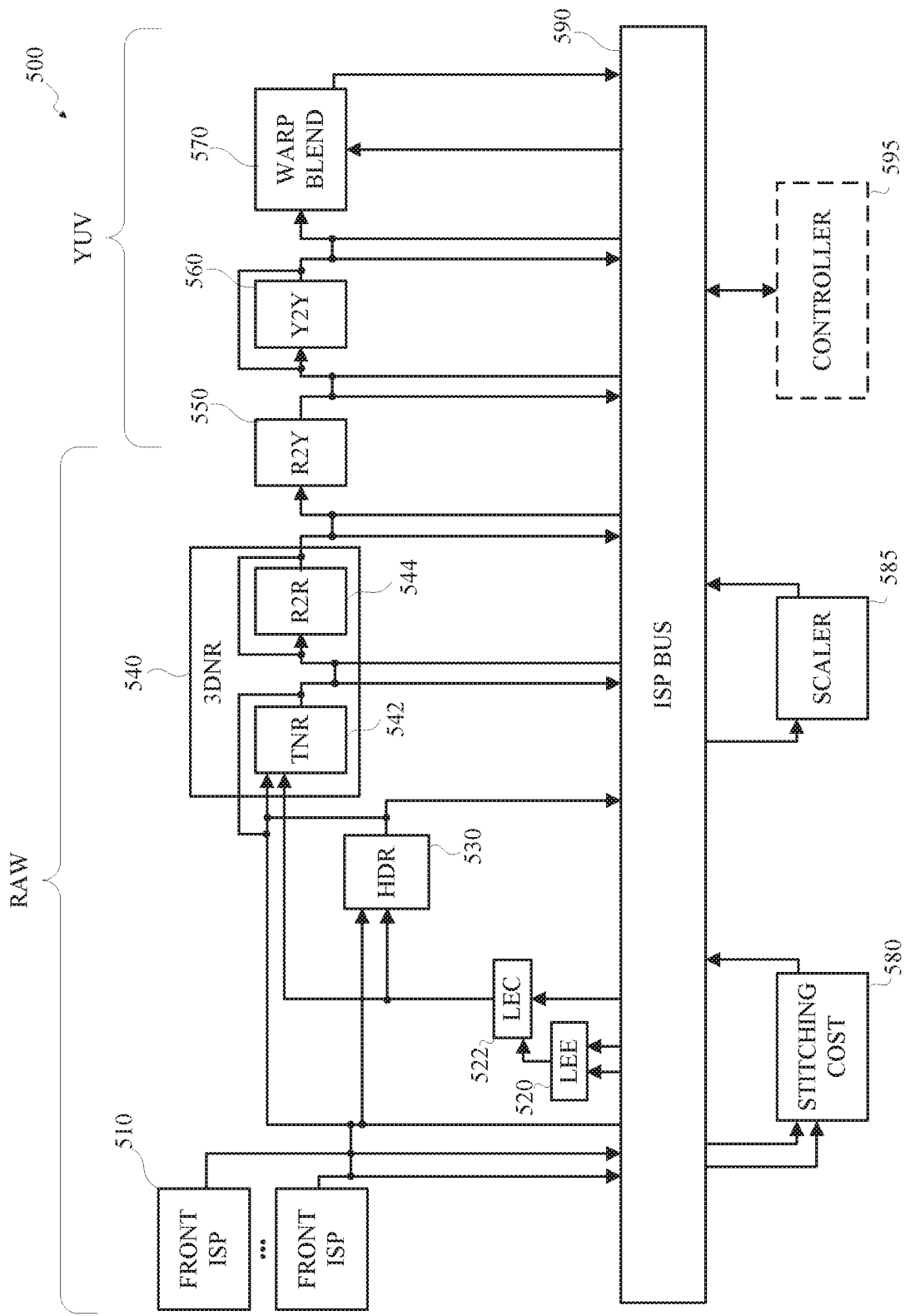
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local exposure estimation unit 520, a local exposure compensation unit 522, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local exposure estimation unit 520, the local exposure compensation unit 522, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with a respective image capture device.

The local exposure estimation unit 520 may receive, or otherwise access, an input frame, or one or more portions thereof, which may be a current input frame, such as via the image signal processor bus 590. In some implementations, the local exposure estimation unit 520 may receive the current input frame at a downscaled, or reduced, resolution. In some implementations, such as implementations implementing high dynamic range image processing, the current input frame may be a long exposure input frame.

The local exposure estimation unit 520 may receive, or otherwise access, a reference frame, or one or more portions thereof, such as via the image signal processor bus 590. The reference frame may be a previously generated exposure compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local exposure estimation unit 520 may receive, or otherwise access, previously generated exposure information, such as previously generated exposure values for the current input frame or exposure information for a previously processed frame.

The local exposure estimation unit 520 may determine exposure information, such as exposure gain values. The local exposure estimation unit 520 may output the exposure information. For example, the local exposure estimation unit 520 may output exposure gain values to the local exposure compensation unit 522.

The local exposure compensation unit 522 may receive, or otherwise access, a reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local exposure compensation unit 522 may receive, or otherwise access, exposure information, such as exposure gain values, associated with the current input frame. For example, the local exposure compensation unit 522 may receive the exposure gain values from the local exposure estimation unit 520.

The local exposure compensation unit 522 may apply the exposure gain values to the reference frame, or one or more portions thereof, which may align, or partially align, the reference frame, or one or more portions thereof, with the current input frame, or one or more portions thereof.

The local exposure compensation unit 522 may output a local exposure compensated reference frame, or one or more portions thereof.

The high dynamic range unit 530 may receive, or otherwise access, the current input frame, or one or more portions thereof, such as from the front image signal processor 510. The current input frame may be a long exposure input frame corresponding to the short exposure reference frame. The high dynamic range unit 530 may receive, or otherwise access, the local exposure compensated reference frame from the local exposure compensation unit 522.

The high dynamic range unit 530 may generate a high dynamic range image based on the current input image and the local exposure compensated reference frame. For example, for a respective portion of the reference frame, such as a respective block, a respective pixel, or a respective Bayer, the temporal noise reduction unit 530 may identify a value for the portion based on the corresponding portion of the local exposure compensated reference frame.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local exposure compensated reference frame from the local exposure compensation unit 522.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local exposure compensation unit 522. For example, for a respective portion of the reference frame, such as a respective block, a respective pixel, or a respective Bayer, the temporal noise reduction unit 530 may identify a value for the portion based on the corresponding portion of the local exposure compensated reference frame.

The temporal noise reduction unit 542 may generate output including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing respective pixels in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of a respective frame to a rectangle. For example, the warp and blend unit 570 may warp a corona around the equator of a respective frame to a rectangle based on the corresponding low-resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear, such as fisheye, images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity (x) and longitude (y) based on a warping. Respective values of the cost map may be a cost function of a disparity (x) value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local exposure compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local exposure estimation unit 520, the local exposure compensation unit 522, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
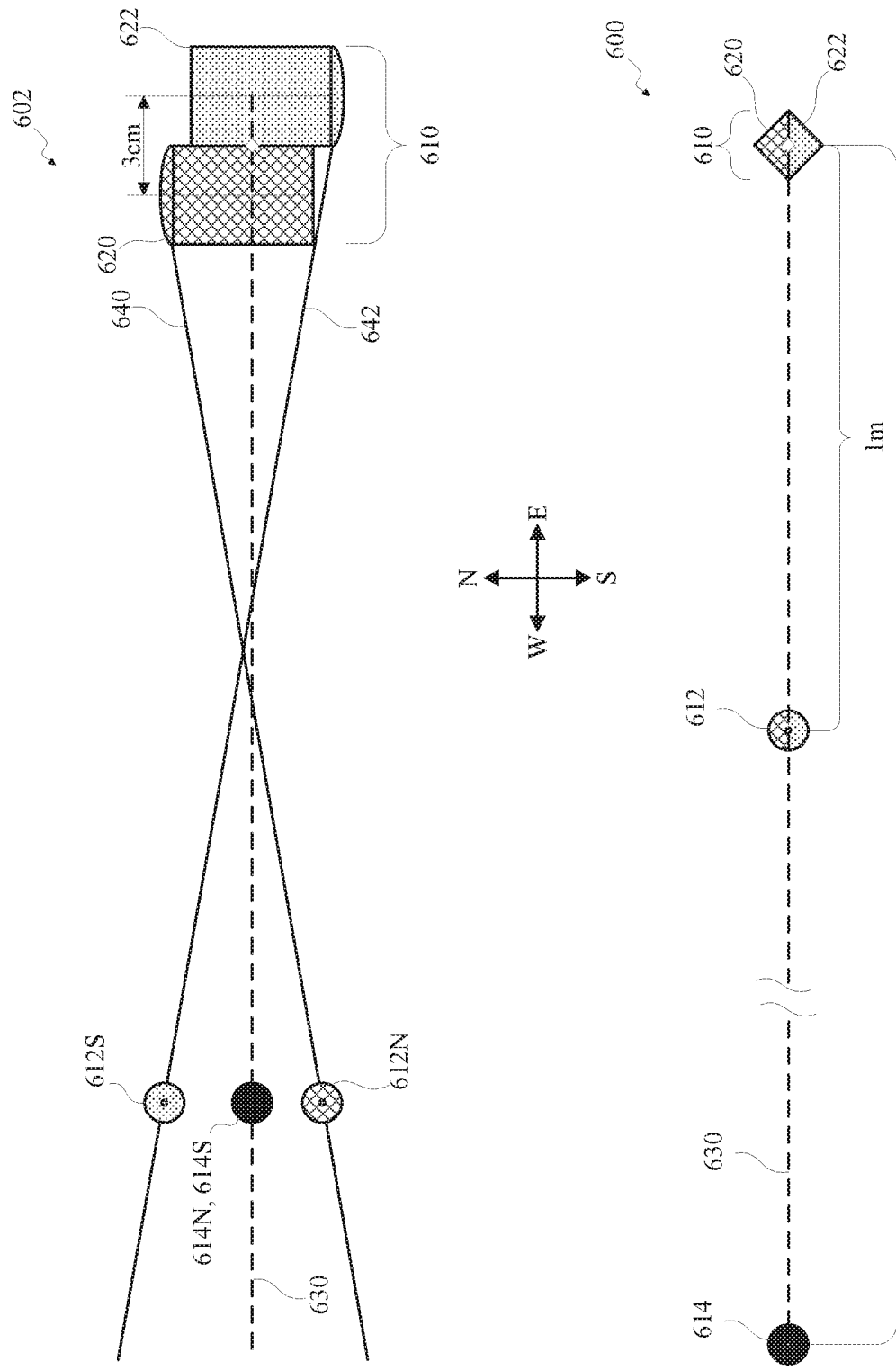
FIG. 6 is a diagram of an example of spatial and field-of-view representations of overlapping fields-of-view for HDR processing in accordance with implementations of this disclosure.

FIG. 6 is a diagram of an example of spatial and field-of-view representations of overlapping fields-of-view for HDR processing on spherical images in accordance with implementations of this disclosure. FIG. 6 is shown as oriented with north at the top and east at the right and is described with reference to longitude and latitude for simplicity and clarity; however, any orientation may be used, direction, longitude, and latitude are described with reference to the image capture apparatus or the respective image capture devices and may differ from geographic analogs.

FIG. 6 includes a lower portion showing a spatial representation 600 of an image capture apparatus 610 including a near object 612 and a far object 614 and an upper portion showing a corresponding field-of-view representation 602 for the image capture apparatus 610 including near object content 612N as captured by the north facing image capture device 620, near object content 612S as captured by the south facing image capture device 622, far object content 614N as captured by the north facing image capture device 620, and far object content 614S as captured by the south facing image capture device 622.

In the spatial representation 600, the image capture apparatus 610, which may be a multi-face image capture apparatus, such as the image capture apparatus 110 shown in FIG. 1 or the image capture apparatus 300 shown in FIG. 3, is represented by a diamond. In some implementations, the multi-face image capture apparatus 610 may include two or more image capture devices 620, 622, such as the image capture device 200 shown in FIG. 2, which may have overlapping field-of-view. In the lower portion of FIG. 6, the north facing image capture device 620 is indicated as a triangle with a cross hatched background, and the south facing image capture device 622 is indicated as a triangle with a stippled background. An equator 630, which may be a midpoint between the two image capture devices 620, 622, is indicated by a broken line.

In the spatial representation 600, the near object 612, which may be captured, in whole or in part, in one or more images captured by the image capture devices 620, 622, is shown as a circle, along the equator 630, having a north half with a cross-hatched background and a south half having a stippled background. The near object 612 may be a relatively short distance from the image capture apparatus 610, such as one meter (1 m) as shown. The far object 614, which may be captured, in whole or in part, in one or more images captured by the image capture devices 620, 622, is shown as a black circle along the equator 630. The far object 614 may be a relatively long distance from the image capture apparatus 610, such as a distance much greater than 1 meter (>>1 m) as shown. For example, the far object 614 may be near the horizon.

In the field-of-view representation 602, the north facing image capture device 620 is shown on the left of the image capture apparatus 610, facing north, with a cross hatched background, and the corresponding north field-of-view is partially represented as including content above, such as north of, a north field-of-view boundary 640. The south facing image capture device 622 of the image capture apparatus 610 is shown on the right, facing south, with a stippled background, and the corresponding south field-of-view is partially represented as including content below, such as south of, a south field-of-view boundary 642.

In some implementations, the respective fields-of-view for the image capture devices 620, 622 may include a defined N° longitudinal dimension, such as 360° of longitude, and may include a defined N° lateral dimension, which may be greater than 180° of latitude. For example, the north facing image capture device 620 may have a field-of-view that extends 10° latitude below the equator 630 as represented by the north field-of-view boundary 640, and the south facing image capture device 622 may have a field-of-view that extends 10° latitude above the equator 630, as represented by the south field-of-view boundary 642. The overlapping region may include 360° of longitude and may include 20° of latitude, which may include a range of 10° north latitude to 10° south latitude.

In some implementations, the image capture devices 620, 622 may be physically offset along one or more spatial axis. For example, as shown in the field-of-view representation 602, the north facing image capture device 620 is offset vertically, such as north-south, and horizontally. In the example shown in FIG. 6, the horizontal, or longitudinal, offset between the image capture devices 620, 622, or between the respective optical centers of the image capture devices 620, 622, is 3 cm; however, other offsets may be used.

As shown in the spatial representation 600, the near object 612 is positioned along the equator 630 and is positioned relatively proximal to the image capture apparatus 610, such as one meter (1 m). The far object 614 is positioned along the equator and is positioned relatively distal (>>1 m) from the image capture apparatus 610. For simplicity and clarity, the distance of the far object 614 may be, as an example, three kilometers from the spatial center of the image capture apparatus 610 as indicated by the small white diamond in the image capture apparatus 610.

As shown in the field-of-view representation 602, the optical center of the north facing image capture device 620 may be offset from the spatial center of the image capture apparatus 610 horizontally by a defined amount, such as by 1.5 cm west laterally, and vertically by a defined amount, such as by 1.5 cm north longitudinally, and the optical center of the south facing image capture device 622 may be offset from the spatial center of the image capture apparatus 610 horizontally by a defined amount, such as by 1.5 cm east laterally, and vertically by a defined amount, such as by 1.5 cm south longitudinally.

In the field-of-view representation 602, the near object content 612N as captured by the north facing image capture device 620, corresponding to the near object 612 shown in the spatial representation 600, the near object content 612S as captured by the south facing image capture device 622, corresponding to the near object 612 shown in the spatial representation 600, the far object content 614N as captured by the north facing image capture device 620, corresponding to the far object 614 shown in the spatial representation 600, and the far object content 614S as captured by the south facing image capture device 622, corresponding to the far object 614 shown in the spatial representation 600, are shown vertically aligned at an intermediate distance from the image capture apparatus 610 to indicate that distance information for the near object 612 and the far object 614 may be unavailable independent of analyzing the images.

In the field-of-view representation 602, the far object content 614N as captured by the north facing image capture device 620 and the far object content 614S as captured by the south facing image capture device 622 are shown along the equator 630 indicating that the position of the far object content 614N as captured by the north facing image capture device 620 may be indistinguishable from the position of the far object content 614S as captured by the south facing image capture device 622. For example, the far object 614, as shown in the spatial representation 600, may be approximately 2,999.9850000375 meters at an angle of approximately 0.00028648° from the optical center of the north facing image capture device 620 and may be approximately 3,000.0150000375 meters at an angle of approximately 0.00028647° from the optical center of the south facing image capture device 622. The angular difference of approximately one hundred-millionth of a degree between the location of the far object 614 relative to the optical center of the north facing image capture device 620 and the location of the far object 614 relative to the optical center of the south facing image capture device 622 may correspond to a difference of zero pixels in the corresponding images.

The position of the near object 612 may differ in the respective images captured by the image capture devices 620, 622. In the field-of-view representation 602, the near object content 612N as captured by the north facing image capture device 620 is shown with a cross-hatched background below the equator 630 indicating that the position of the near object content 612N as captured by the north facing image capture device 620 may be slightly below the equator 630, such as 1° south latitude, and the near object content 612S as captured by the south facing image capture device 622 is shown with a stippled background above the equator 630 indicating that the position of the near object content 612S as captured by the south facing image capture device 622 may be slightly above the equator 630, such as 1° north latitude. For example, the near object 612, as shown in the spatial representation 600, may be approximately 1.01511083 meters at an angle of approximately 0.846674024° from the optical center of the north facing image capture device 620, and may be approximately 0.985114207 meters at an angle of approximately 0.872457123° from the optical center of the south facing image capture device 622. The angular difference of approximately 1.72° between the location of the near object 612 relative to the optical center of the north facing image capture device 620 and the location of the near object 612 relative to the optical center of the south facing image capture device 622 may correspond to a difference of one or more pixels in the corresponding images.

In some implementations, images captured by the image capture devices 620, 622 may be combined to generate a combined image wherein overlapping regions and transitions between overlapping regions, such as portions corresponding to field-of-view boundaries 640, 642, are visually cohesive. In some implementations, combining images may include aligning overlapping regions of the images to adjust for differences between the relative locations of the respective image capture devices 620, 622 and the content captured by the images. In some implementations, aligning overlapping regions of images may be based on the physical alignment of the respective image capture devices 620, 622 of the image capture apparatus 610, the distance between the respective image capture devices 620, 622 of the image capture apparatus 610 and the content captured by the images, or both.

When a whole spherical scene is captured by several sensors, several exposure durations and gain values may be used to process an HDR image. For example, this may be achieved by capturing and then combining several different, narrower range, exposures of the same subject matter. Differences in exposure durations and gain values may be up to 8 stops where a stop is a unit used to quantify ratios of light or exposure, with each added stop meaning a factor of two, and each subtracted stop meaning a factor of one-half. When the image is processed, these differences should be compensated. Two or more hyper-hemispherical sensors may be used to capture the whole spherical scene, where a hyper-hemispherical sensor may be a lens that is capable of capturing a total field of view resulting in up to 360 degrees in azimuth angle and up to 270 degrees in zenithal angle.

Figure 7:
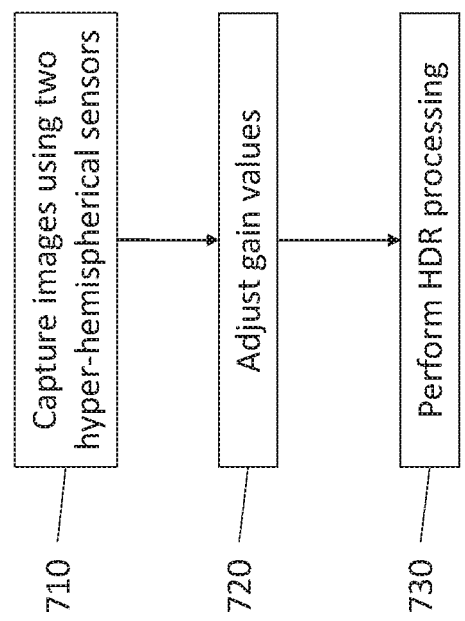
FIG. 7 is a flow chart of an example of a method for HDR processing on spherical images.

FIG. 7 is a flow chart of an example of a method for HDR processing on spherical images. In this example, at operation 710, images are captured using two hyper-hemispherical sensors. At operation 720, gain values are adjusted to compensate for exposure differences in the images captured by the two sensors. At operation 730, HDR processing is performed on the low spatial frequency portions of the exposure compensated image to leverage the blindness of the human eye to low spatial frequencies. Examples of HDR processing are discussed in further detail below.

FIG. 8 is a diagram of an example of compensating for an exposure difference between two hyper-hemispherical sensors. In this example, two hyper-hemispherical sensors are used to generate two independent images that are stitched together. A first hyper-hemispherical sensor 810 captures a short exposure image signal (S1) and a long exposure image signal (L1), each associated with a first image. The second hyper-hemispherical sensor 820 captures a short exposure image signal (S2) and a long exposure image signal (L2), each associated with a second image. Each of the image signals has an associated exposure time and respective sensor gain, for example S1 has a short exposure time (SET1) having a sensor gain SG1 and a long exposure time (LET1) having a sensor gain LG1, where $LG1 \times LET1 \geq SG1 \times SET1$. Similarly, S2 has a short exposure time (SET2) having a sensor gain SG2 and a long exposure time (LET2) having a sensor gain LG2, where $LG2 \times LET2 \geq SG2 \times SET2$. Accordingly, two independent exposure values are stored on N bits for each pixel. The sensor gain may also be referred to as ISO gain.

A gain factor or value may be applied to the images to compensate for the differences in exposure time or duration. For example, a gain value of greater than or equal to 1 may be applied to a dark image (i.e., an image with a low exposure) to brighten the image. Conversely, a gain value of less than or equal to 1 may be applied to a lighter image (i.e., an image with a high exposure) to darken the image.

One example of building an HDR signal may be to apply a constant gain of less than 1 to the long exposure signals to align them with the exposure levels of the short exposure signals. This gain may be expressed as $k=(SET \times SG) \div (LET \times LG)$, where $k \leq 1$. However, to preserve the information on both images, this signal may be stored on at least M bits, where $M>N$. For example, the lowest M value in order to not lose information would be $M=N+\operatorname{ceil}(\log 2 \ (1/k))$. As $M>N$, a high dynamic range image is created having a high dynamic range signal. Accordingly, image compression is performed in order to display the information stored on the high dynamic range image on a low dynamic range screen (with a dynamic range L where $L<M$ and $L \leq N$) without sacrificing the signal in the least significant bits that correspond to the signal that is scaled form the long exposure to the HDR image.

The exposure compensated image may be shown as a decomposition into two additive layers. The image compression may be performed by modifying a low spatial frequency signal X-bar while keeping X–X-bar untouched. For example, X=X-bar+(X–X-bar), where X-bar refers to a portion of a signal containing low spatial frequencies, for example greater than or equal to 90 degrees, and (X–X-bar) refers to the remaining portion of the signal containing higher spatial frequencies, for example less than or equal to 90 degrees. One method to adjust the low spatial frequencies of the image without impacting the contrast on the high spatial frequencies may be to apply a gain g such as X'=g(X-bar)*X. As g is applied as a function of X-bar, it varies according to the low frequency signal. For example, g may be designed to compress the low frequency contrast such that the dynamic range of an HDR image is reduced so that it may be displayed on a low dynamic range screen. The low frequency contrast may be compressed by reducing the variance or the entropy of X-bar, for example. An edge-aware non-linear filter, such as a bilateral filter, may be applied on the image.

An example of such an HDR processing may be to build a base layer from the total spherical image. This may be accomplished by averaging the pixel values of a large disc over a portion of the spherical image, for example approximately 90 degrees to 100 degrees of diameter. A resulting spherical image may then be computed by suppressing all or a part of the base layer by dividing the total spherical image by the base layer. In another example, the total spherical image may be processed using a high-pass filter, for example, a linear high-pass filter, where the base layer is subtracted from the total spherical image.

In some examples, the process may be conjugated. For example, the process may be conjugated by a transform $f$, where a function $f$ is applied before processing (i.e., transform each value v into value $f(v)$) and an inverse off is applied after processing, where f is an increasing value. For example, if the process includes computing X-bar as the average over a large disc and generating an output by subtracting X-bar from X, the conjugated process would be computing Y from X by applying $f$ to each pixel value of X, computing Y-bar as the average over a large disc, subtracting Y-bar from Y, and generating an output by applying the inverse of $f$ to the result of the subtraction. In an example where $f(x)=\log(x)$, the additive process described above becomes a multiplicative process. Alternatively, $f(x)=\log(x)$ may first be applied to a spherical image before HDR processing, then X-bar may be computed on this image, followed by performing an additive process to lower or suppress the base layer, and applying the inverse of $f$ (i.e., $\exp(x)$) to the result, which may be more efficient than directly applying a multiplicative process on the spherical image. In some examples, other processing may be applied such as local tone mapping, global tone mapping, or both, to enhance the spherical image by reducing the initial dynamic range without compromising the visually noticeable content. For example, image compression may be performed by applying a local tone mapping by preserving high frequency details and compressing the base layer with a non-linear gain function g.

Alternatively, a local exposure compensation may be performed to make the stitch line imperceivable to the human eye. For example, the gain values near the stitch line may be adjusted and the gain value adjustments are progressively decreased the further away the pixels are located from the stitch line.

An implementation may include an apparatus that includes a first hyper-hemispherical image sensor, a second hyper-hemispherical image sensor, and an image signal processor. The image signal processor may be configured to obtain a first image from the first hyper-hemispherical image sensor. The first image may include a short exposure image signal, a long exposure image signal, or both.

The image signal processor may be configured to obtain a second image from the second hyper-hemispherical image sensor. The second image may include a short exposure image signal, a long exposure image signal, or both. In an example, the image signal processor may be configured to join an edge of the first image to an edge of the second image to form a stitch point between the edge of the first image and the edge of the second image.

The image signal processor may be configured to determine an exposure level for each of the first image, the second image, or both. In an example, the exposure level of the first image may be lower than the exposure level of the second image. The image signal processor may be configured to obtain an exposure compensated image. The exposure compensated image may be based on a gain value applied to the exposure level of the first image, a gain value applied to the exposure level of the second image, or both. In an example, the exposure compensated image may have a higher dynamic range than the first image, the second image, or both.

The image signal processor may be configured to perform HDR processing on the exposure compensated image to obtain an HDR image. In an example, the HDR processing may be performed on a high a frequency portion of the exposure compensated image. The high frequency portion of the exposure compensated image may include a field of view that is less than or equal to 90 degrees. The HDR processing may include obtaining a base layer from the exposure compensated image. The base layer may be obtained by averaging two or more values over a disc larger than 90 degrees. In an example, the base layer may be obtained by applying an edge-aware non-linear filter. The edge-aware non-linear filter may be a bilateral filter.

The image signal processor may be further configured to compress the base layer. For example, the image signal processor may be configured to compress the base layer by suppressing a portion of the base layer. For example, the image signal processor may suppress a portion of the base layer by dividing the exposure compensated image by the base layer. In another example, the image signal processor may suppress a portion of the base layer by subtracting the base layer from the exposure compensated image.

The image signal processor may be configured to apply a local tone mapping operator to the HDR image. For example, the local tone mapping operator may be applied by compressing the base layer and preserving high frequency details.

An implementation may include a method for obtaining an HDR image. The method may include obtaining a short exposure image signal associated with a first image, a long exposure image signal associated with the first image, or both. The method may include obtaining a short exposure image signal associated with a second image, a long exposure image signal associated with the second image, or both.

The method may include determining an exposure level for each of the first image, the second image, or both. In an example, the exposure level of the first image may be lower than the exposure level of the second image.

The method may include obtaining an exposure compensated image based on a gain value applied to the exposure level of the first image, a gain value applied to the exposure level of the second image, or both. In an example, the exposure compensated image may have a higher dynamic range than the first image, the second image, or both.

The method may include obtaining an HDR image by performing HDR processing on the exposure compensated image. The HDR processing may be performed on a high a frequency portion of the exposure compensated image. The HDR processing may include obtaining a base layer from the exposure compensated image. For example, the base layer may be obtained by averaging two or more values over a disc larger than 90 degrees. In another example, the base layer may be obtained by applying an edge-aware non-linear filter. The edge-aware non-linear filter may be a bilateral filter.

The method may include compressing the base layer. For example, the base layer may be compressed by suppressing a portion of the base layer. The portion of the base layer may be suppressed by dividing the exposure compensated image by the base layer.

An apparatus may include an image signal processor. The image signal processor may be configured to determine an exposure level for each of a first image, a second image, or both. The exposure level of the first image may be lower than the exposure level of the second image. The image signal processor may be configured to obtain an exposure compensated image. The exposure compensated image may be based on a gain value applied to the exposure level of the first image, a gain value applied to the exposure level of the second image, or both. The exposure compensated image may have a higher dynamic range than the first image, the second image, or both. The image signal processor may be configured to obtain an HDR image. The image signal processor may obtain the HDR image by performing HDR processing on a high a frequency portion of the exposure compensated image.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C #, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire, such as FW400, FW110, and/or other variations, USB, such as USB2, Ethernet, such as 10/100, 10/100/1000 (Gigabit Ethernet, 10-Gig-E, and/or other Ethernet implementations), MoCA, Coaxsys, such as TVnet™, radio frequency tuner, such as in-band or out-of-band, cable modem, and/or other radio frequency tuner protocol interfaces, Wi-Fi (802.11), WiMAX (802.16), personal area network (PAN), such as 802.15, cellular, such as 3G, LTE/LTE-A/TD-LTE, GSM, and/or other cellular technology, IrDA families, and/or other network interfaces.

As used herein, the term "Wi-Fi" includes one or more of IEEE-Std. 802.11, variants of IEEE-Std. 802.11, standards related to IEEE-Std. 802.11, such as 802.11 a/b/g/n/s/v, and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(such as, IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum, such as infrared, ultraviolet, and/or other energy, such as pressure waves.

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An apparatus comprising:
a first hyper-hemispherical image sensor configured to:
detect a short exposure image signal associated with a first image, wherein the short exposure image signal has a first sensor gain and a first exposure time; and
detect a long exposure image signal associated with the first image, wherein the long exposure image signal has a second sensor gain and a second exposure time;
a second hyper-hemispherical image sensor;
an image signal processor configured to:
obtain, from the first hyper-hemispherical image sensor, the short exposure image signal associated with the first image and the long exposure image signal associated with the first image;
obtain, from the second hyper-hemispherical image sensor, a short exposure image signal associated with a second image and a long exposure image signal associated with the second image;
join an edge of the first image to an edge of the second image to form a stitch point between the edge of the first image and the edge of the second image to obtain a spherical image;
determine an exposure level for each of the first image and the second image, wherein the exposure level of the first image is lower than the exposure level of the second image;
obtain an exposure compensated image based on first gain values applied to the exposure level of the first image and second gain values applied to the exposure level of the second image, wherein the first gain values and the second gain values are variable based on a distance from the stitch point;
obtain a base layer from the exposure compensated image, wherein the base layer includes first pixel values that are an average of pixel values over a disc portion of the spherical image;
apply a transform function to each pixel value of the first pixel values to obtain a transformed base layer;
subtract the transformed base layer from the exposure compensated image to obtain a processed image, wherein the processed image includes second pixel values; and
apply an inverse of the transform function to each pixel value of the second pixel values to obtain a high dynamic range (HDR) image.

2. The apparatus of claim 1, wherein the first gain values and the second gain values are reduced as the distance from the stitch point increases.

3. The apparatus of claim 1, wherein the HDR image has a first frequency contrast portion and a second frequency contrast portion.

4. The apparatus of claim 1, wherein the second frequency contrast portion includes higher spatial frequencies than the first frequency contrast portion.

5. The apparatus of claim 1, wherein the base layer is obtained by applying a non-linear filter.

6. The apparatus of claim 5, wherein the non-linear filter is a bilateral filter.

7. The apparatus of claim 1, wherein the image signal processor is further configured to compress the base layer.

8. The apparatus of claim 7, wherein the image signal processor is further configured to compress the base layer by suppressing a portion of the base layer by dividing the exposure compensated image by the base layer.

9. The apparatus of claim 3, wherein the image signal processor is further configured to compress the first frequency contrast portion to reduce a dynamic range of the HDR image for display on a low dynamic range display.

10. The apparatus of claim 1, wherein the image signal processor is further configured to apply a local tone mapping operator to the HDR image by compressing the base layer and preserving high frequency details.

11. A method comprising:
  detecting a first short exposure image signal associated with a first image, wherein the first short exposure image signal has a first sensor gain and a first exposure time;
  detecting a first long exposure image signal associated with the first image, wherein the first long exposure image signal has a second sensor gain and a second exposure time;
  detecting a second short exposure image signal associated with a second image, wherein the second short exposure image signal has a third sensor gain and a third exposure time;
  detecting a second long exposure image signal associated with the second image, wherein the second long exposure image signal has a fourth sensor gain and a fourth exposure time, wherein a product of the third sensor gain and the third exposure time is less than a product of the fourth sensor gain and the fourth exposure time;
  determining an exposure level for each of the first image and the second image, wherein the exposure level of the first image is lower than the exposure level of the second image;
  obtaining an exposure compensated image based on first gain values applied to the exposure level of the first image and second gain values applied to the exposure level of the second image, wherein the first gain values and the second gain values are variable based on a distance from a stitch point of the first image and the second image;
  obtaining a base layer from the exposure compensated image, wherein the base layer includes first pixel values that are an average of pixel values over a disc portion of a spherical image;
  applying a transform function to each pixel value of the first pixel values to obtain a transformed base layer;
  subtracting the transformed base layer from the exposure compensated image to obtain a processed image, wherein the processed image includes second pixel values; and
  applying an inverse of the transform function to each pixel value of the second pixel values to obtain a high dynamic range (HDR) image.

12. The method of claim 11, wherein the HDR image has a first frequency contrast portion and a second frequency contrast portion.

13. The method of claim 12, wherein the second frequency contrast portion includes higher spatial frequencies than the first frequency contrast portion.

14. The method of claim 11, wherein the base layer is obtained by applying a non-linear filter.

15. The method of claim 14, wherein the non-linear filter is a bilateral filter.

16. The method of claim 11, further comprising:
  compressing the base layer.

17. The method of claim 16, wherein compressing the base layer includes suppressing a portion of the base layer by dividing the exposure compensated image by the base layer.

18. An apparatus comprising:
  an image signal processor configured to:
    determine a first exposure level for a first image based on a first short exposure image signal and a first long exposure image signal, wherein the first short exposure image signal has a first sensor gain and a first exposure time and the first long exposure image signal has a second sensor gain and a second exposure time;
    determine a second exposure level for a second image based on a second short exposure image signal and a second long exposure image signal, wherein the second short exposure image signal has a third sensor gain and a third exposure time and the second long exposure image signal has a fourth sensor gain and a fourth exposure time, and wherein a product of the third sensor gain and the third exposure time is less than a product of the fourth sensor gain and the fourth exposure time;
    obtain an exposure compensated image based on first gain values applied to the first exposure level of the first image and second gain values applied to the second exposure level of the second image, wherein the first gain values and the second gain values are variable based on a distance from a stitch point of the first image and the second image;
    obtain a base layer from the exposure compensated image, wherein the base layer includes first pixel values that are an average of pixel values over a disc portion of a spherical image;
    apply a transform function to each pixel value of the first pixel values to obtain a transformed base layer;
    subtract the transformed base layer from the exposure compensated image to obtain a processed image, wherein the processed image includes second pixel values; and
    apply an inverse of the transform function to each pixel value of the second pixel values to obtain a high dynamic range (HDR) image.

19. The apparatus of claim 18, wherein the image signal processor is further configured to apply a gain value to the low frequency portion of the exposure compensated image, wherein the gain value is applied as a function of a high frequency portion of the exposure compensated image.

20. The apparatus of claim 19, wherein the image signal processor is further configured to apply a local tone mapping operator to the HDR image.

* * * * *